US009519480B2

(12) United States Patent
Alexander et al.

(10) Patent No.: US 9,519,480 B2
(45) Date of Patent: Dec. 13, 2016

(54) BRANCH TARGET PRELOADING USING A MULTIPLEXER AND HASH CIRCUIT TO REDUCE INCORRECT BRANCH PREDICTIONS

(75) Inventors: Gregory W. Alexander, Pflugerville, TX (US); Anton Blanchard, Marrickville (AU); Milton D. Miller, II, Austin, TX (US); Todd A. Venton, Austin, TX (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1736 days.

(21) Appl. No.: 12/029,258

(22) Filed: Feb. 11, 2008

(65) Prior Publication Data

US 2009/0204798 A1    Aug. 13, 2009

(51) Int. Cl.
G06F 9/312       (2006.01)
G06F 9/30        (2006.01)
G06F 9/38        (2006.01)

(52) U.S. Cl.
CPC ......... G06F 9/30043 (2013.01); G06F 9/3005 (2013.01); G06F 9/3804 (2013.01); G06F 9/3806 (2013.01)

(58) Field of Classification Search
CPC .. G06F 9/30047; G06F 9/3005; G06F 9/3842; G06F 12/0864; G06F 9/30043; G06F 9/3806
USPC .......................... 712/220, 233-234, 237-240
See application file for complete search history.

(56) References Cited

U.S. PATENT DOCUMENTS

| 5,682,531 | A   | * | 10/1997 | Nakamura ............... 718/108 |
| 6,108,775 | A   | * | 8/2000  | Shiell et al. ............ 712/240 |
| 6,223,280 | B1  | * | 4/2001  | Horton et al. ........... 712/240 |
| 6,397,326 | B1  | * | 5/2002  | Horton et al. ........... 712/240 |
| 6,611,910 | B2  | * | 8/2003  | Sharangpani et al. ..... 712/237 |
| 6,877,089 | B2  | * | 4/2005  | Sinharoy ................ 712/239 |
| 7,962,722 | B2  | * | 6/2011  | Levenstein et al. ...... 712/205 |
| 2005/0278513 | A1 | * | 12/2005 | Aristodemou et al. .... 712/228 |
| 2009/0313462 | A1 | * | 12/2009 | Emma et al. ........... 712/240 |

FOREIGN PATENT DOCUMENTS

EP        0798632 A2 * 10/1997 .......... G06F 9/38

OTHER PUBLICATIONS

Irie, N. et al. "Branch Micro-Architecture of an Embedded Processor With Split Branch Architecture for Digital Consumer Products," IEICE Transactions on Electronics, vol. E85-C, Issue 2, Feb. 2002, pp. 315-322.
Bekerman, M. et al. "Correlated Load-Address Predictors," International Symposium on Computer Architecture, Atlanta, Georgia, US, IEEE, 1999, pp. 54-63.

(Continued)

Primary Examiner — David J Huisman
(74) Attorney, Agent, or Firm — Yudell Isidore PLLC

(57) ABSTRACT

A system provides complex branch execution hardware and a hardware-based Multiplexer (MUX) to multiplex a fetch address of a future branch and a preloaded branch fetch address to create an index hash value that is used to index a branch target prediction table for execution by a processor core, in order to reduce branch mis-prediction by preloading.

12 Claims, 4 Drawing Sheets

(56) References Cited

OTHER PUBLICATIONS

Lai, A. et al. "Memory Sharing Predictor: The Key to a Speculative Coherent DSM," Proceedings of the 26th Annual International Symposium on Computer Architecture, IEEE, May 1999, pp. 172-183.

Yang, Z. et al. "Overlapping Dependent Loads With Addressless Preload," Proceedings of the 15th International Conference on Parallel Architectures and Compilation Techniques (PACT'06), Seattle, WA, USA, Sep. 16-20, 2006, pp. 275-284.

Ertl, M. A. et al. "Optimizing Indirect Branch Prediction Accuracy in Virtual Machine Interpreters," PLDI/03, Jun. 9-11, 2003, San Diego, California, USA, pp. 278-288.

Gordon-Ross, A. et al. "Tiny Instruction Caches for Low Power Embedded Systems," ACM Transactions on Embedded Computing Systems, vol. 2, No. 4, Nov. 2003, pp. 449-481.

\* cited by examiner

BRANCH TARGET PRELOADING USING A MULTIPLEXER AND HASH CIRCUIT TO REDUCE INCORRECT BRANCH PREDICTIONS

BACKGROUND OF THE INVENTION

The present invention relates in general to computers, and in particular to computer hardware. Still more particularly, the present invention relates to a system, method, and computer program for optimizing efficiency of a processor by eliminating branch mispredictions.

SUMMARY OF THE INVENTION

Disclosed is a system for using complex branch execution hardware and a hardware based Multiplexer (MUX) to multiplex a fetch address of a future branch and a branch fetch address to create an index hash value that is used to index a branch target prediction table for execution by a processor core, in order to reduce branch mis-prediction by preloading.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
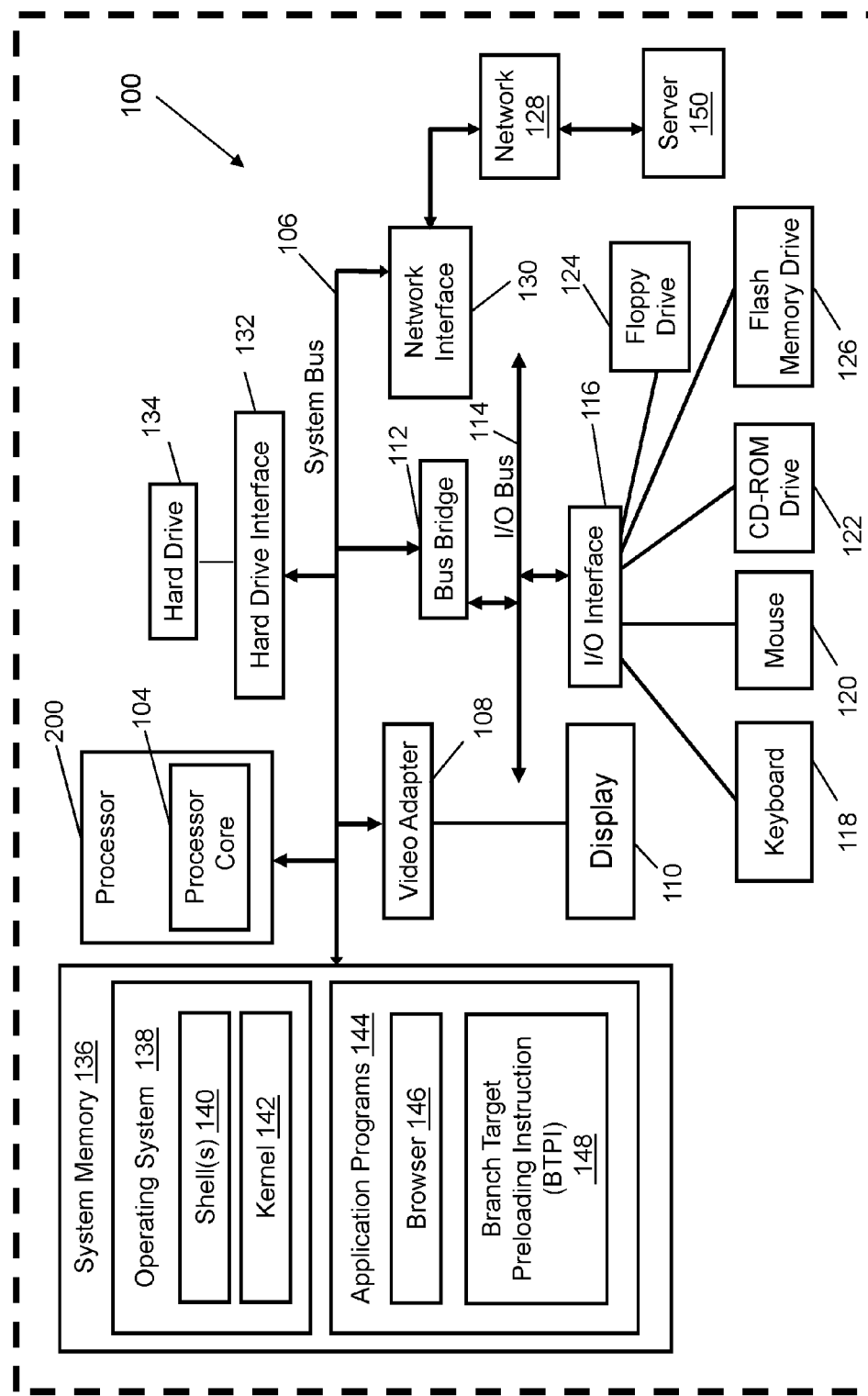
FIG. 1 is a block diagram of a data processing system in which the present invention may be implemented.

With reference now to FIG. 1, there is depicted a block diagram of an exemplary computer 100 in which the present invention may be implemented. Computer 100 includes one or more processor cores 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 100 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 100.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes computer 100's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 100) to send and receive network messages to the Internet using HyperText Transfer Protocol (HTTP) messaging, thus enabling communication with software deploying server 150.

Application programs 144 in computer 100's system memory (as well as software deploying server 150's system memory) also include a Branch Target Preloading Instruction (BTPI) 148. Execution of BTPI 148 by processor core 104 causes use of the prefetch path in FIGS. 2-3.

Processor 200, which may or may not be a discrete chip, includes the processor core(s) 104 and hardware necessary to preload predicted target address information of a future instruction using index hash information.

The hardware elements depicted in computer 100 are not intended to be exhaustive, but rather are representative to highlight components required by the present invention. For instance, computer 100 may include alternate memory storage devices such as magnetic cassettes, Digital Versatile Discs (DVDs), Bernoulli cartridges, and the like. These and other variations are intended to be within the spirit and scope of the present invention.

Figure 2A:
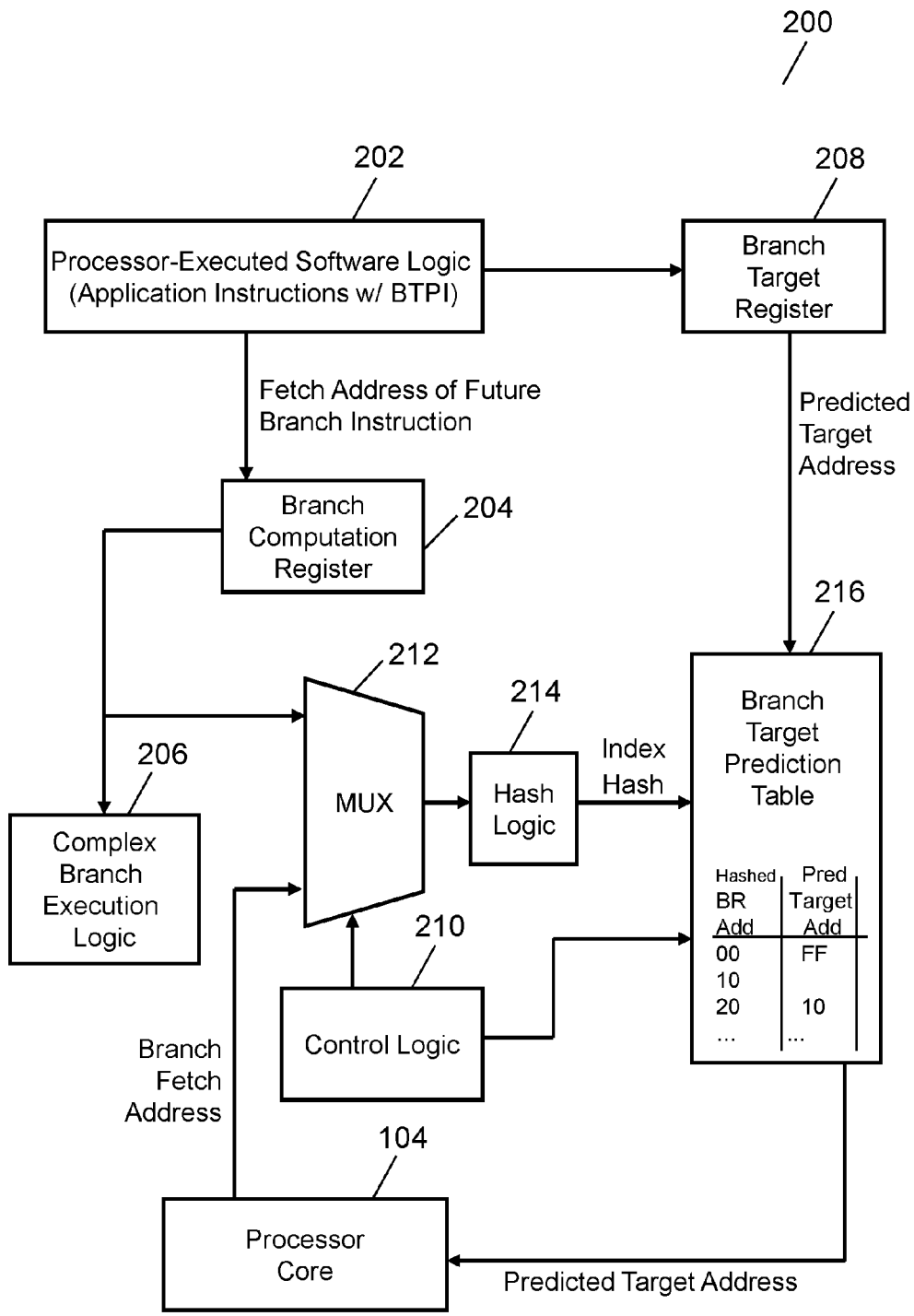
FIGS. 2A and 2B depict two alternate embodiments of exemplary components of the overall system incorporating a multiplex device to preload prediction hash data into a branch target prediction table.
Figure 2B:
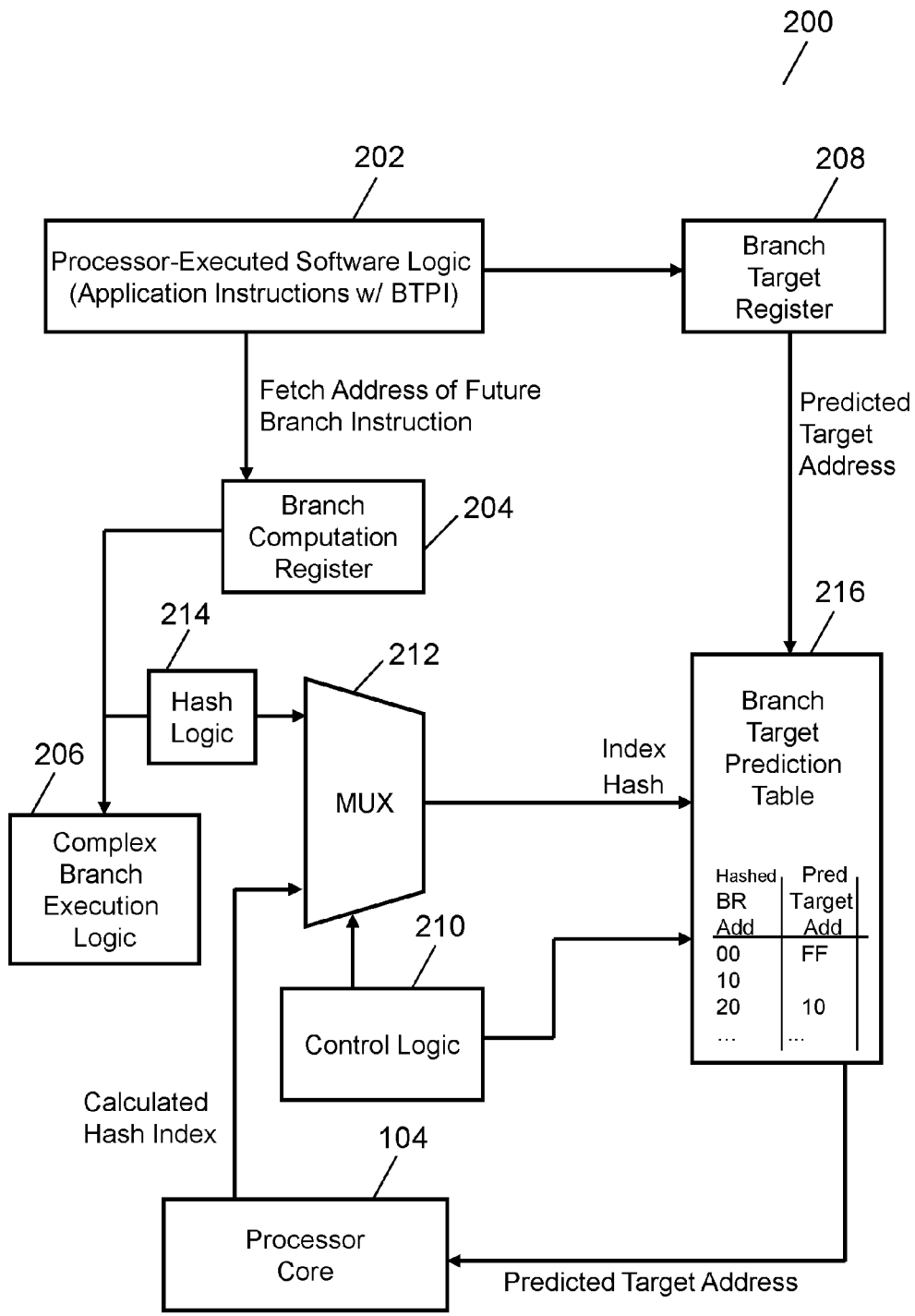

With reference now to FIGS. 2A and 2B, two alternate embodiments of a high level illustration detailing exemplary components of a Processor 200, the overall system incorporating a multiplex device to preload predicted branch targets into a branch target prediction table for execution, are presented.

Traditionally, some processors include complex branch execution logic capable of executing a complex branch instruction. The complex branch instructions include reading a Branch Computation Register and using that register to compute whether or not the branch should be taken. Examples of complex branch instructions are 'decrement and branch if zero', which decrements the branch computation register and branches based on the decremented value, and 'compare and branch', which compares the values of two branch computation registers and determines which branch will be taken based on the result of the compare.

In the present invention, as Processor-Executed Software Logic ("Software") 202 (i.e., an example application having instructions that includes a BTPI) is in use (i.e., the software instructions being received and processed by one or more components of the processor 200), Software 202 stores the fetch address of a future branch instruction in Branch Computation Register 204, which is also used by Complex Branch Execution Logic 206. Branch Computation Register 204 may be a register specific to this purpose or a general purpose register. Software 202 also stores the predicted target address of the aforementioned future branch instruction in Branch Target Register 208. Branch Target Register 208 may be a register specific to this purpose or a general purpose register. Upon execution of a BTPI within Software 202, Control Logic 210 directs MUX 212 to select the input data from Branch Computation Register 204. In the embodiment of FIG. 2A, Hash Logic 214 creates an index hash by reading the output of MUX 212. Alternatively, as shown in FIG. 2B, Hash Logic 214 could be placed before MUX 212, at the output of Branch Computation Register 204. The index hash is used as the write index within Branch Target Prediction Table 216. Branch Target Register 208 communicates the predicted target address of the future branch instruction to Branch Target Prediction Table 216 through a direct connection. Control Logic 210 then causes Branch Target Prediction Table 216 to write, which causes the predicted target address from Branch Target Register 208 to be written at the location indicated by the index hash. After this process is complete, Processor Core 104, when fetching a branch instruction, calculates a hash index on the fetch address of the branch instruction and reads the predicted target address stored at the calculated hash index in the Branch Target Prediction Table 216. Alternatively, Processor 200 can use hash logic 214 to calculate the hash index on the branch fetch address outputted by Processor Core 104. Logic internal to the Processor Core 104, redirects fetching to the predicted target address if the branch is taken, using either the branch fetch address when implementing the embodiment of FIG. 2A or the calculated hash index of the branch fetch address when implementing the embodiment of FIG. 2B, to avoid a branch mis-prediction.

While Software 202 is running, it calculates a target fetch address and a fetch address of a future branch instruction. However, because the Branch Target Address Table 216 may not contain the predicted target address for this future branch instruction, a preload instruction is utilized. For example, Software 202 determines the fetch address of future branch instruction to be "20," and the predicted target address of the same future branch instruction to be "10." The Software 202 then loads the predicted target address "10" into the Branch Target Register 208, and the fetch address of future branch instruction "20" into the Branch Computation Register 204. The software then executes a BTPI. Upon execution of the BTPI, the hardware instructs MUX 212 to select address data, read from Branch Computation Register 204, and calculates an index hash based on the selected data from the Branch Computation Register 204. This information is sent via a single transmission line to index the Branch Target Prediction Table 216. The Branch Target Prediction Table 216 is then written at the calculated index with the predicted target address "10" in the Branch Target Register 208. At the index based on a hash of branch fetch address "20" within the Branch Target Prediction Table 216, the target fetch address "10" would be written. The Processor Core 104 then can predict the correct branch target by reading the predicted target address within the Branch Target Prediction Table 216, at the calculated hash index.

Figure 3:
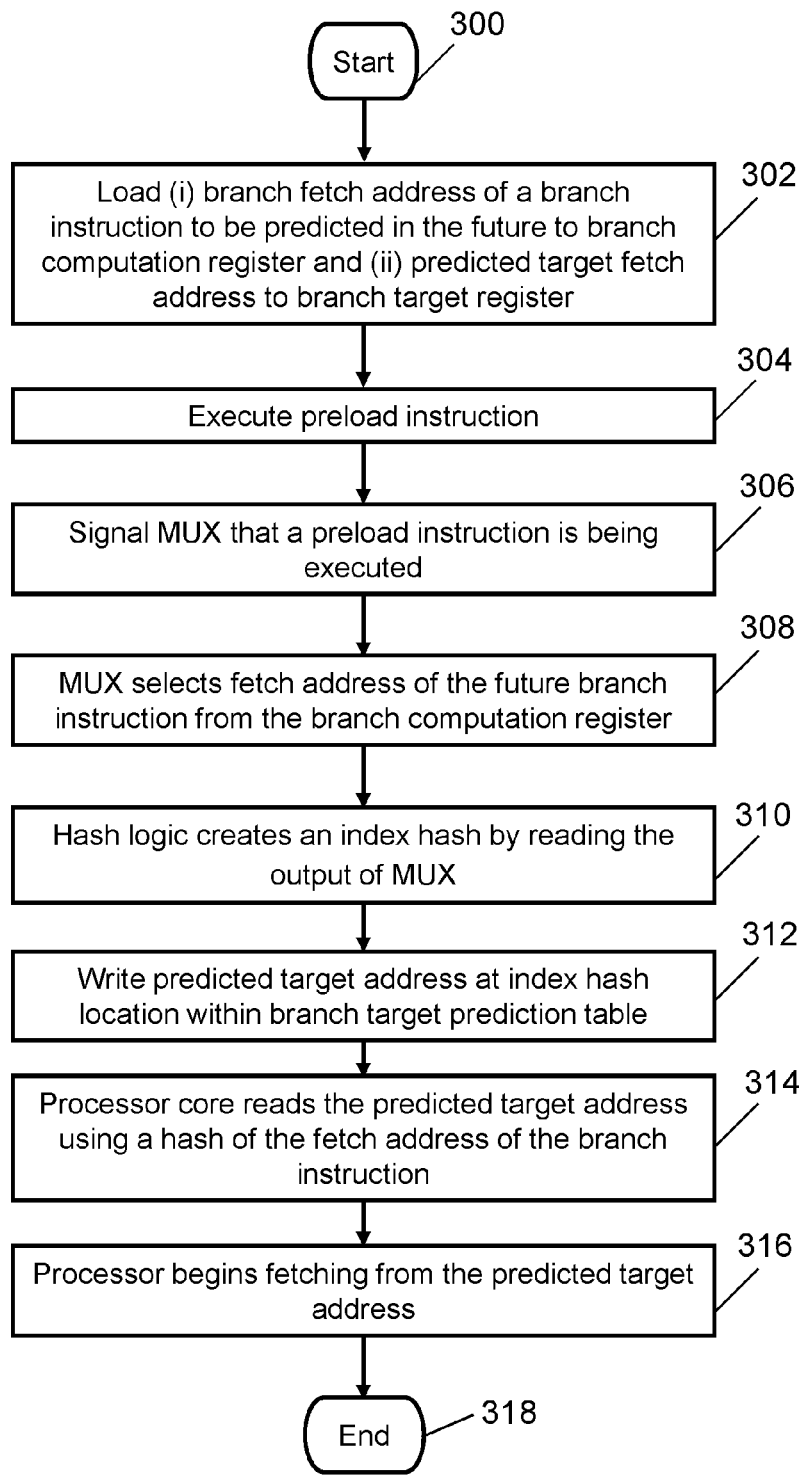
FIG. 3 is a high-level logical flowchart of exemplary set of steps performed to preload prediction hash data into a branch target prediction table.

With reference now to FIG. 3, there is provided a high-level logical flowchart of exemplary set of steps performed to preload predicted target addresses to the target branch prediction table. After initiator block 300, the software loads the fetch address of the future branch instruction in to the branch computation register, and loads the predicted target address of the future branch instruction into the branch target register (block 302). Software then executes a preload instruction (block 304). Upon execution of a preload instruction, the hardware signals the MUX that a preload instruction is being executed (block 306). Following this, the MUX selects the fetch address of the future branch instruction from the branch computation register (block 308). Next, the hash logic creates an index hash by reading the output of the MUX (block 310). The predicted target address is written into the branch target prediction table at the index calculated by the index hash (block 312). Upon execution of a branch instruction, logic internal to the processor core reads the predicted target address stored in the branch target prediction table at a hash of the location of the branch instruction (block 314). If the branch is predicted taken, the processor then begins fetching from the predicted target address (block 316). The process ends at terminator block 318.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A computer processor comprising:
   a Multiplex device (MUX) comprised of a first input, a second input, and one MUX output, wherein the first input is coupled to a source of a branch fetch address, the second input is coupled to a read port of a branch computation register that stores a first branch fetch address of a branch instruction to be predicted, and the MUX output is coupled to a branch target prediction table;

a branch target register that provides a predicted target address to the branch target prediction table;

logic circuits for:
  autonomously determining when a preload instruction is being executed; and
  in response to autonomously determining the preload instruction is being executed:
    directing the MUX to select the first branch fetch address of the branch instruction from the branch computation register;
    reading an index value at the MUX output;
    computing, via an index hash logic circuit, an index hash of the index value at the MUX output, wherein the index hash logic circuit is directly connected at an input to the MUX output and at an output to the branch target prediction table;
    indexing the branch target prediction table using the index hash; and
    writing the predicted target address from the branch target register to the branch target prediction table, wherein the predicted target address is written at a location within the branch target prediction table corresponding to the index hash; and a processor core coupled to the branch target prediction table, wherein the processor core:
  in response to fetching the branch instruction after writing the predicted target address at the location within the branch target prediction table corresponding to the index hash, provides the first branch fetch address to the first input of the MUX;
  reads the branch target prediction table at a hash index calculated from the first branch fetch address to retrieve the predicted target address; and
  in response to the branch instruction being predicted taken, redirects fetching to the predicted target address stored in the branch target prediction table.

2. The computer processor of claim 1, further comprising a complex branch execution logic circuit for executing one or more complex branch instructions using the read port of the branch computation register.

3. The computer processor of claim 2, wherein the complex branch execution logic circuit further comprises logic for executing a decrement-and-branch-if-zero instruction.

4. The computer processor of claim 2, wherein the complex branch execution logic circuit comprises logic for executing a compare-and-branch instruction.

5. A data processing system comprising:
a memory;
a system bus coupled to the memory; and
a computer processor coupled to the system bus, wherein the computer processor comprises:
  a Multiplex device (MUX) comprised of a first input, a second input, and one MUX output, wherein the first input is coupled to a source of a branch fetch address, the second input is coupled to a read port of a branch computation register that stores a first branch fetch address of a branch instruction to be predicted, and the MUX output is coupled to a branch target prediction table;
  a branch target register that provides a predicted target address to the branch target prediction table;
  logic circuits that:
    autonomously determine when a preload instruction is being executed; and
    in response to autonomously determining the preload instruction is being executed:
      direct the MUX to select the first branch fetch address of the of the branch instruction from the branch computation register;
      read an index value at the MUX output;
      compute, via an index hash logic circuit, an index hash of the index value at the MUX output, wherein the index hash logic circuit is directly connected at an input to the MUX output and at an output to the branch target prediction table;
      index the branch target prediction table using the index hash; and
      write the predicted target address from the branch target register to the branch target prediction table, wherein the predicted target address is written at a location within the branch target prediction table corresponding to the index hash; and
  a processor core coupled to the branch target prediction table, wherein the processor core:
    in response to fetching the branch instruction after writing the predicted target address at the location within the branch target prediction table corresponding to the index hash, provides the first branch fetch address to the first input of the MUX;
    reads the branch target prediction table at a hash index calculated from the first branch fetch address to retrieve the predicted target address; and
    in response to the branch instruction being predicted taken, redirects fetching to the predicted target address stored in the branch target prediction table.

6. The data processing system of claim 5, further comprising a complex branch execution logic circuit for executing one or more complex branch instructions using the read port of the branch computation register.

7. The data processing system of claim 6, wherein the complex branch execution logic circuit further comprises logic that executes a decrement-and-branch-if-zero instruction.

8. The data processing system of claim 6, wherein the complex branch execution logic circuit further comprises logic that executes a compare-and-branch instruction.

9. A computer processor comprising:
  a Multiplex device (MUX) comprised of a first input, a second input, and one MUX output, wherein the first input is coupled to a source of a hash index of a branch fetch address, and the second input is coupled to an output of a hash logic circuit, wherein an input of the hash logic circuit is directly coupled to a read port of a branch computation register that stores a first branch fetch address of a branch instruction to be predicted, and wherein the MUX output is coupled to a branch target prediction table;
  a branch target register that provides a predicted target address to the branch target prediction table;
  logic circuits for:
    autonomously determining when a preload instruction is being executed; and
    in response to autonomously determining the preload instruction is being executed:

computing, via the hash logic circuit, a hash of the first branch fetch address;

directing the MUX to select the hash of the first branch fetch address at the output of the hash logic circuit;

reading an index hash at the MUX output;

indexing the branch target prediction table using the index hash; and writing the predicted target address from the branch target register to the branch target prediction table, wherein the predicted target address is written at a location within the branch target prediction table corresponding to the index hash; and a processor core coupled to the branch target prediction table, wherein the processor core:

in response to fetching the branch instruction after writing the predicted target address at the location within the branch target prediction table corresponding to the index hash, calculates a hash index on the first branch fetch address;

reads the branch target prediction table at the calculated hash index to retrieve the predicted target address; and in response to the branch instruction being predicted taken, redirects fetching to the predicted target address stored in the branch target prediction table.

10. The computer processor of claim 9, further comprising a complex branch execution logic circuit for executing one or more complex branch instructions using the read port of the branch computation register.

11. The computer processor of claim 10, wherein the complex branch execution logic circuit further comprises logic for executing a decrement-and-branch-if-zero instruction.

12. The computer processor of claim 10, wherein the complex branch execution logic circuit comprises logic for executing a compare-and-branch instruction.

* * * * *